United States Patent [19]
Rohde et al.

[11] Patent Number: 5,413,455
[45] Date of Patent: May 9, 1995

[54] APPARATUS FOR COLLECTING AND ORDERED BUNDLING OF LONG ROLLING STOCK

[75] Inventors: Johann-Heinrich Rohde, Ratingen; Eberhard Adamitzki, Mönchengladbach; Rainer Derix, Heinsberg, all of Germany

[73] Assignee: Mannesmann Aktiengesellschaft, Dusseldorf, Germany

[21] Appl. No.: 66,768

[22] Filed: May 25, 1993

[30] Foreign Application Priority Data

May 29, 1992 [DE] Germany .................. 42 18 336.7

[51] Int. Cl.⁶ .................................................. B65G 57/04
[52] U.S. Cl. .............................. 414/793.2; 414/398; 414/609
[58] Field of Search ............ 414/398, 609, 626, 746.8, 414/793.2

[56] References Cited

U.S. PATENT DOCUMENTS

| | | | |
|---|---|---|---|
| 4,081,084 | 3/1978 | Guinn et al. | 414/626 |
| 4,303,365 | 12/1981 | Euverard et al. | 414/793.2 |
| 4,416,580 | 11/1983 | Hoga et al. | 414/626 |
| 4,579,498 | 4/1986 | Lukkari et al. | 414/793.2 |

FOREIGN PATENT DOCUMENTS

| | | |
|---|---|---|
| 3438707A1 | 4/1986 | Germany . |
| 57678 | 5/1977 | Japan ............ 414/793.2 |
| 22413 | 2/1980 | Japan ............ 414/793.2 |
| 4182224 | 6/1992 | Japan ............ 414/793.2 |

*Primary Examiner*—Michael S. Huppert
*Assistant Examiner*—Gregory A. Morse
*Attorney, Agent, or Firm*—Cohen, Pontani, Lieberman, Pavane

[57] ABSTRACT

An apparatus for collecting and bundling long rolling stock includes a collecting station for a layer of rolling stock lying side-by-side, a receiving device for the layer of rolling stock, a bundle forming station arranged at a side of the collecting station, and an arrangement for transporting the layer of rolling stock into a depositing position in the bundle forming station. The transporting arrangement includes two support arches that stand at a distance from another and span at least a collecting station and a bundle forming station. Each of the support arches defines a travel path having a horizontal segment that is guided into a vertical segment in a region of the bundle forming station. A carriage is arranged at each support arch so that both carriages are synchronously movable on the travel paths. A cross-piece is provided so as to join together the two support arches and support the receiving device, each end of the cross-piece is supported by one of the carriages so that the cross-piece is movable parallel to the rolling stock, and a device for carrying off the bundled rolling stock from the bundle forming station.

7 Claims, 4 Drawing Sheets

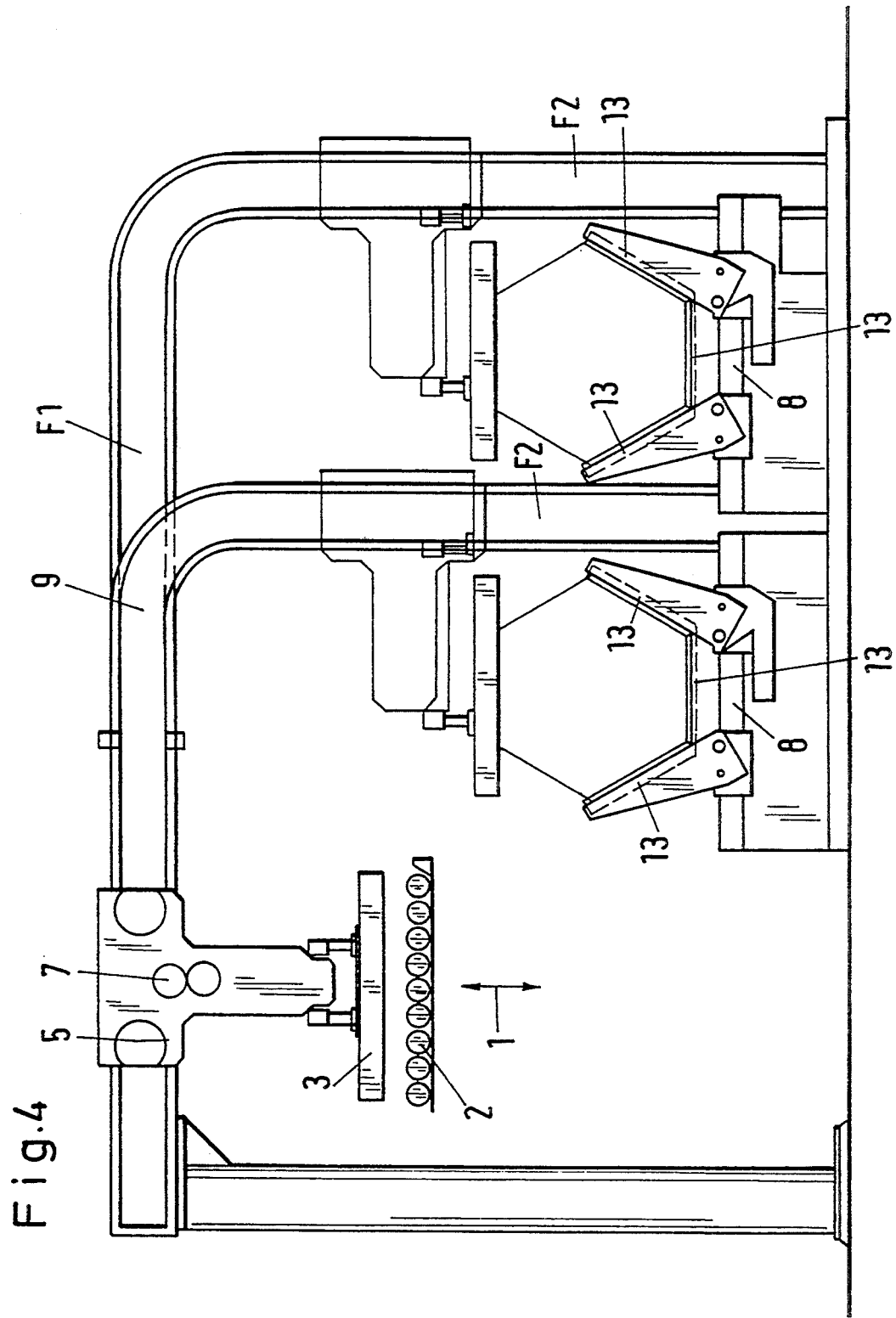

APPARATUS FOR COLLECTING AND ORDERED BUNDLING OF LONG ROLLING STOCK

BACKGROUND OF THE INVENTION

1. Field of the Invention

The invention is directed to an apparatus, for the collecting and ordered bundling of long rolling stock, particularly rods and pipes. Such a device includes a collecting station for a layer of rolling stock lying side by side, a receiving device for the layer of rolling stock, which receiving device preferably comprises magnet shoes, and devices for transporting the layer of rolling stock into a depositing position in a bundle forming station arranged at the side of the collecting station, as well as conveying means for carrying off bundled rolling stock.

2. Description of the Related Art

A device of the generic type is known from DE-A1-34 38 707. Such devices have the aim of gathering long rolling stock in bundles so as to enable transportation of such bundles. In the case of pipes, the greatest packing density is achieved when the pipes are combined in so-called hexagon bundles in which the longitudinal sides are comprised of at least three pipes. Such hexagon bundles can be advantageously stacked for further transport.

The known device includes two pairs of girders, which are connected with one another in an articulated manner and with a magnet shoe and the stand plate in an articulated manner, as well as intermediately arranged work cylinders. The pair of girders are connected in a corresponding manner, being arranged at a distance from one another corresponding approximately to the length of the pipe, and are supported so as to be swivelable at right angles to a separator. The device is costly and requires a complicated controlling of the flow of movements for taking over the layers of rolling stock and transferring them to the bundle forming station. Because of the large number of moving parts, the known device is susceptible to wear and requires frequent maintenance.

SUMMARY OF THE INVENTION

Proceeding from the described prior art, it is an object of the present invention to provide a particularly simple and reliably operating device for collecting and for ordered bundling of long rolling stock which also enables the desired bundle to be formed in a short period of time.

Pursuant to this object, and others which will become apparent hereafter, one aspect of the present invention resides in providing the device with two support arches that stand at a distance from one another, span at least the collecting station and the bundle forming station, and are joined by a cross-piece which is movable parallel to the rolling stock and supports the receiving device for the group or layer of rolling stock. The cross-piece is moved in that it is supported at both ends in carriages which are movable synchronously on travel paths (rails) at the support arches, and the horizontally extending travel paths (rails) are guided in vertical directions into the region of the bundle forming station.

The inventive installation meets the demand for quick successive bundle times in an inexpensive installation. The rolling stock which is lifted into the region of the receiving device is held by the magnet shoes and can be transferred simply and accurately into the bundle forming station. The layer of rolling stock is transported into the bundle forming station without the need for adjusting overlapping movements at the receiving device simply by means of the movement of the cross-piece on travel paths with the aid of the carriages. To this end, the travel paths (rails) are simply guided in the direction of the bundle forming station, i.e. deflected in the vertical line, so that the layer of rolling stock is transported with an individual movement drive or travel mechanism to the location where bundles are to be formed.

In so doing, according to an embodiment of the present invention, two bundle forming stations can be supplied by one pair of carriages, in that the travel paths are deflected in the vertical direction, i.e. to a bundle forming station in each instance, at both sides of a horizontally extending travel path segment.

According to another embodiment of the invention, the travel paths can also be guided in vertical directions from a plurality of horizontal segments by means of points or switches, so that a plurality of bundle forming stations can be serviced when correspondingly branched travel paths are provided.

A compulsory or positive movement of the carriages ensures that the receiving device remains in the horizontal direction for the layer when the carriage is deflected from the horizontal into the vertical plane.

Advantageously, the drive of the carriages is effected via toothed racks arranged at the travel paths via toothed wheels or, according to a further embodiment of the invention, via chains and chain wheels. In so doing, the synchronous running of the two carriages at the portals is provided for.

Transfer carriages for the bundled rolling stock are positioned adjacent to the bundle collecting stations in the longitudinal direction of the rolling stock for carrying off the bundled rolling stock. These transfer carriages can be moved out of the region of the devices for collecting and bundling on travel paths extending transversely to the rolling stock. These transfer carriages receive the bundled rolling stock and transport it from the region of the device to a location where it can be taken over, e.g. by a crane, after being wrapped.

The main advantage of the present invention is that the movement directions of the rolling stock can be effected horizontally and vertically with only one drive (travel mechanism of the carriages) so that the device operates simply, quickly and reliably as a whole.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the drawings:

FIG. 4 shows a further embodiment of the inventive device.

DESCRIPTION OF THE PREFERRED EMBODIMENTS

Figure 1:
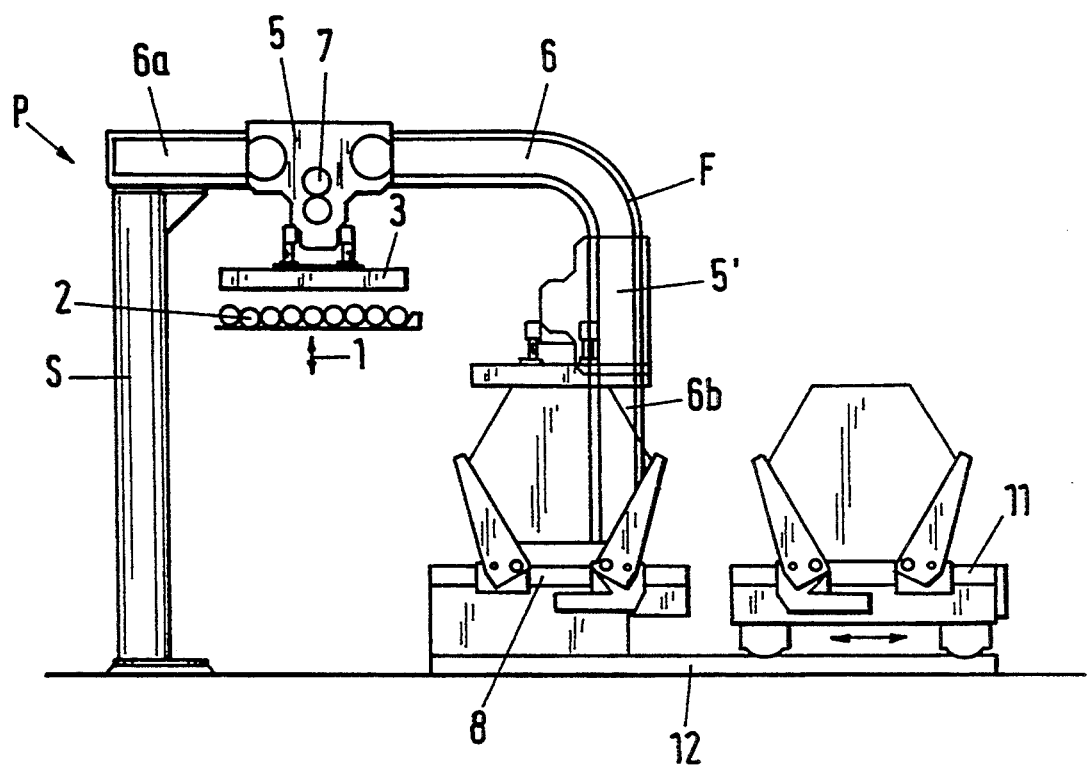
FIG. 1 shows the device according to the invention in a greatly simplified manner.
Figure 2:
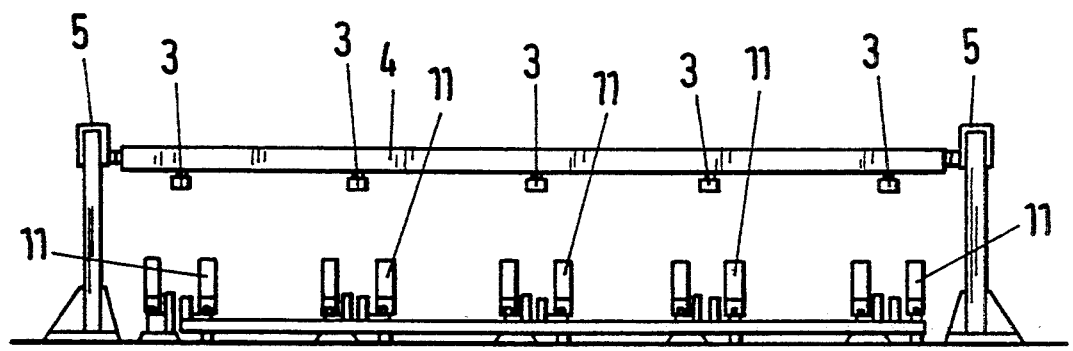
FIG. 2 shows a plan and top view of the inventive device according to FIG. 1.
Figure 2:
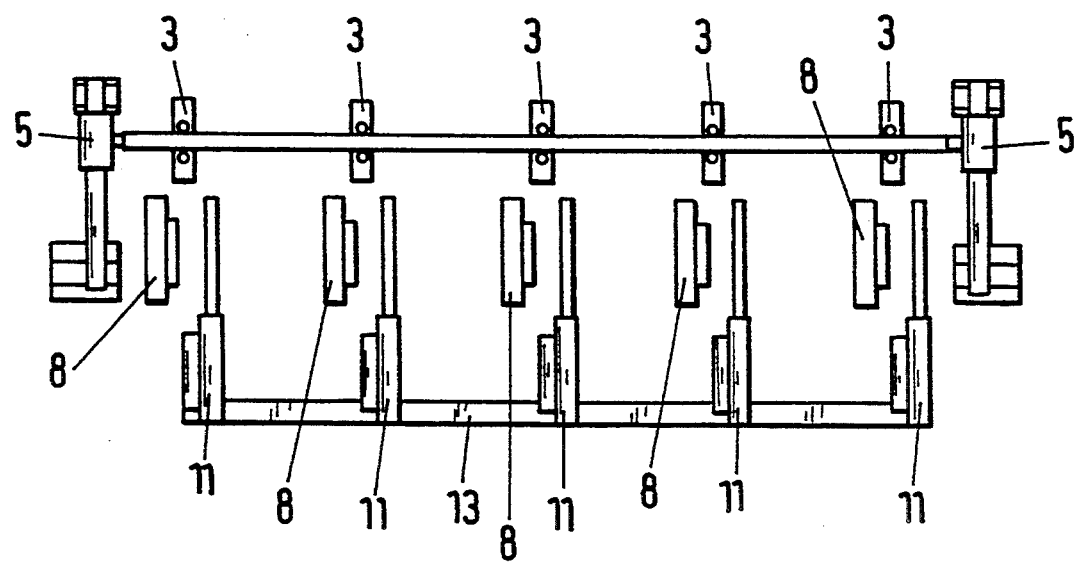

FIG. 1 shows a support arch P of the device according to the invention which is formed by a column S and a travel path F. The support arch P spans a collecting station 1, and a bundle forming station 8. The travel path F of the support arch P has rails 6 which are combined to form a horizontal segment 6a and the vertical segment 6b. The guiding from horizontal to vertical is effected in a continuous manner. A carriage 5 is guided on rollers and driven via toothed rack drives, not shown, at each rail 6. The carriages 5 are fastened at the ends of a cross-piece 4 connecting two support arches P, as is shown in FIG. 2. A plurality of receiving devices 3 are arranged at a distance from one another at the cross-piece 4 and comprise magnet shoes by means of which the rolling stock, pipes 2 in the present example, can be received by the collecting station 1.

A device 7 ensures that the receiving device 3 always remains in a horizontal attitude during the traveling movement of the carriage 5 at the rails 6 as is indicated by thinner lines at 5'. This enables an ordered transfer of the layer of pipes 2 at the bundle forming station 8.

A transfer carriage 11 is movable from an end position, shown in the drawing, to a second end position in which the transfer carriage 11 is aligned with the bundle forming stations 8. In this way it is possible to move the rolling stock bundle formed in the bundle forming station 8 out of the inventive device by means of the carriage 11 which is movable on rails 12. A plurality of these carriages are arranged one after the other so that the bundles can be lifted out e.g. with a crane after wrapping.

The transfer carriages 11 are connected with one another at 13, as can be seen in FIG. 2. Otherwise, identical parts are provided with the same reference numbers.

Figure 3:
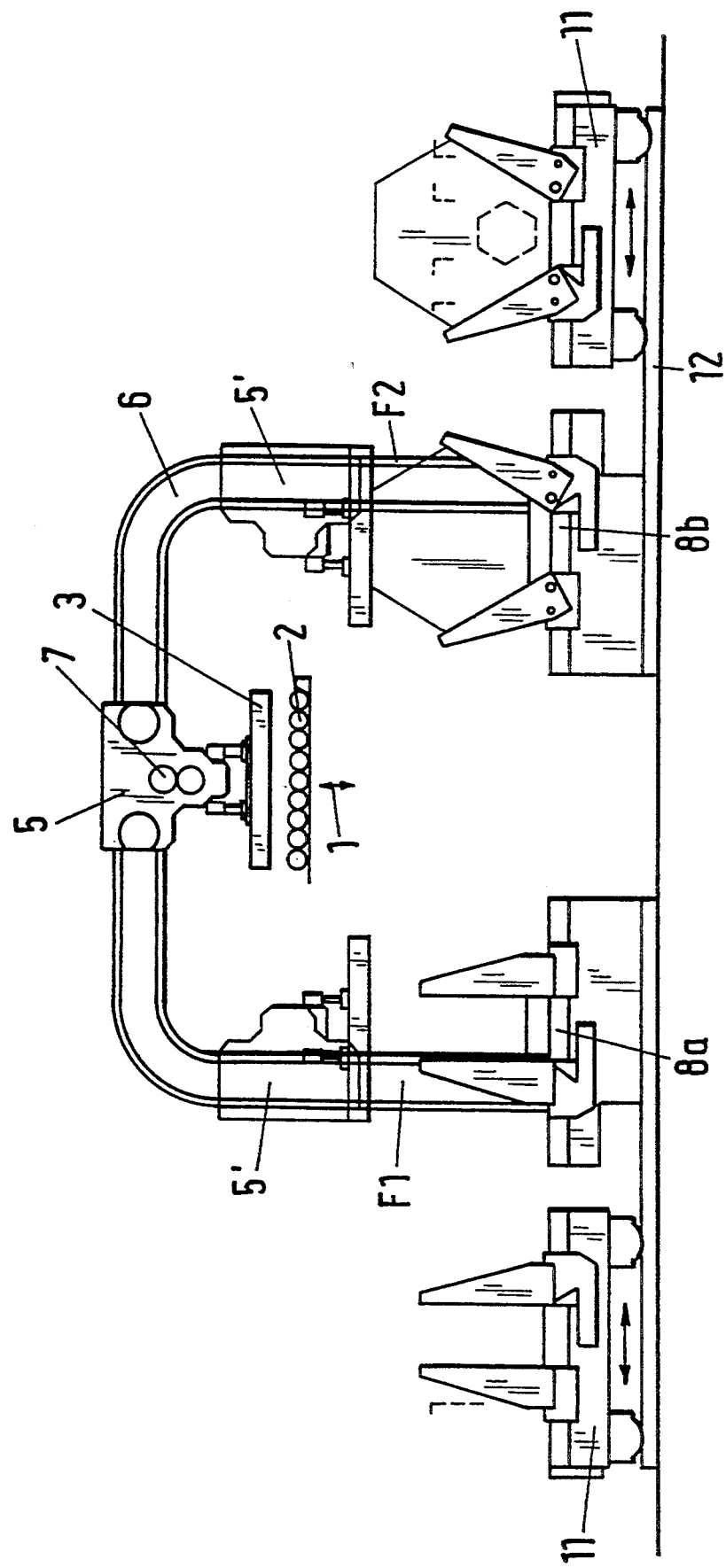
FIG. 3 shows an alternative embodiment of the inventive device.

An alternative construction of the device according to the invention is shown in FIG. 3. In this case, the support arch has two travel paths F1 and F2 which are guided around in a vertical direction so that two bundle forming stations 8a, 8b can be serviced by a common cross-piece with carriages 5. The collecting station 1 is arranged in the center of the support arch. The transfer carriages 11, which are arranged at both sides of the support arch so as to be movable on rails, also serve in this instance to carry off the completed bundles.

Finally, FIG. 4 shows another variant of the invention. In this instance, the travel paths F are provided with switches 9 which make it possible to transfer the carriages 5 with the cross-piece 4 to as many locations as desired and accordingly to guide the layers of rolling stock from the horizontal line to the vertical line so as to service a corresponding number of bundle forming stations.

In this case, the bundles are carried off in the axial direction by means of the rollers 13 arranged in the bundle forming stations.

In every case, only one drive is required for the carriages 5 so that there is no need for a division of horizontal and vertical drives.

While the invention has been illustrated and described as embodied in a device for collecting and bundling long rolling stock, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. An apparatus for collecting and bundling of long rolling stock, comprising: a collecting station for a layer of rolling stock lying side-by-side; a receiving device for the layer of rolling stock, said receiving device including magnetic shoes; a bundle forming station arranged at a side of the collecting station; means for transporting the layer of rolling stock into a depositing position in the bundle forming station, said transporting means including two support arches that stand at a distance from one another and span at least to the collection station and the bundle forming station, each of the support arches having rails which define a travel path having a horizontal segment and two vertical segments, which vertical segments are in a region of the bundle forming station, a carriage being arranged at each support arch so that both carriages are synchronously movable on the travel paths; a cross-piece for joining together the two support arches and for supporting the receiving device, each end of the cross-piece being supported by one of the carriages so that the cross-piece is movable parallel to the rolling stock; conveying means for carrying off bundled rolling stock from the bundle forming station; and switches for switching the travel path between the vertical segments from the plurality of horizontal segments.

2. The apparatus according to claim 1, wherein the vertical segments of each travel path are respectively arranged at both ends of the horizontal segment.

3. The apparatus according to claim 1, wherein the cross-piece is supported at the carriages so that the receiving device remains in a horizontal plane in any position of the carriages.

4. The apparatus according to claim 1, further comprising toothed racks and toothed wheels arranged at the travel paths so as to drive the carriages.

5. The apparatus according to claim 1, further comprising chains and chain wheels arranged so as to drive the carriages.

6. The apparatus according to claim 1, wherein the conveying means includes transfer carriages for the bundled rolling stock, said transfer carriage being positioned adjacent to the bundle forming station in a longitudinal direction of the rolling stock, the conveying means being movable out of a region of the collecting and bundling stations on travel paths extending transversely to the rolling stock.

7. The apparatus according to claim 1, wherein the bundle forming station is provided with rollers which enable the bundles to be carried off in an axial direction.

* * * * *